Sept. 2, 1958 A. KEHL 2,850,056
FEW TEETH SAW BLADE
Filed Feb. 17, 1955
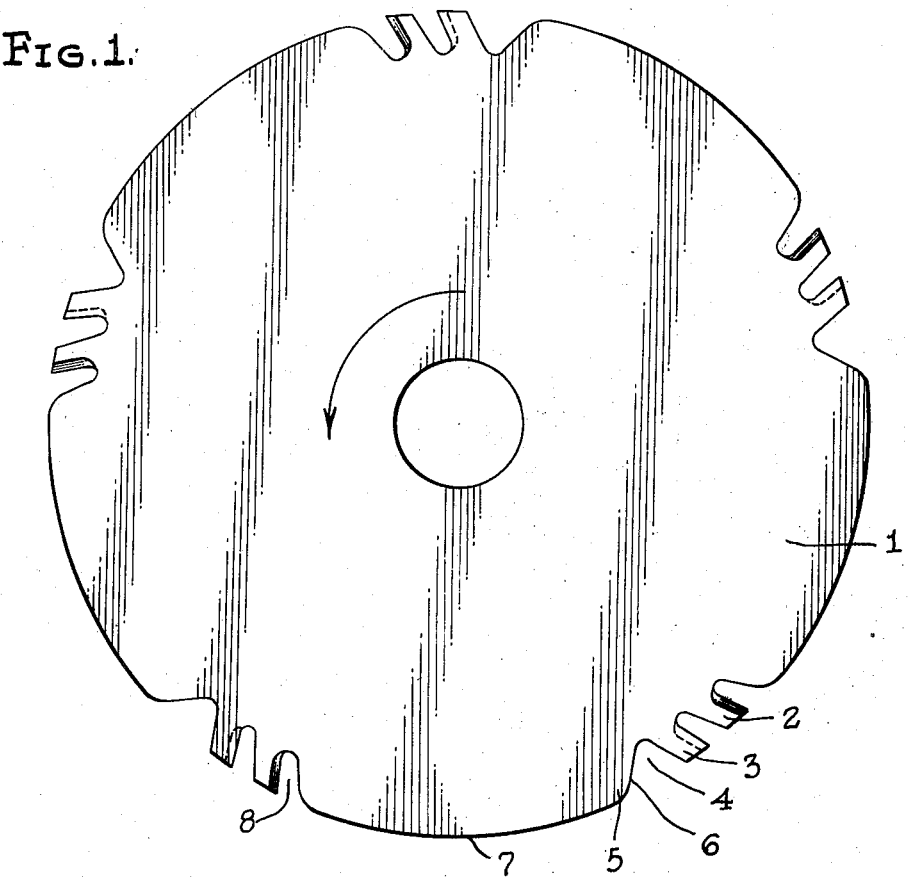
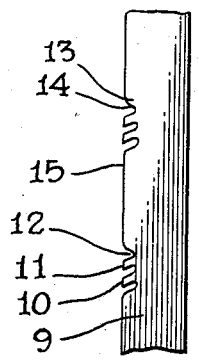
INVENTOR
ARNO KEHL
BY
ATTORNEY

United States Patent Office 2,850,056
Patented Sept. 2, 1958

2,850,056

FEW TEETH SAW BLADE

Arno Kehl, Erfurt, Germany

Application February 17, 1955, Serial No. 488,844

2 Claims. (Cl. 143—133)

This invention concerns circular or band saw blades not having teeth immediately succeeding one another, so-called few teeth saw blades. According to this invention a saw blade is produced having advantages in the domain of protecting the operator as well as in economical regard. In addition to the reduced danger of hurting, safety against rebounding, quieter running compared to full teeth saw blades, and a certain higher economy offered by the few teeth saw blades, according to the invention, this blade especially gives by appropriate guiding of the sawdust even at greatest cutting speed a very quiet run and thereby a very great economy; the danger of accidents, when handling the saw blade according to this invention, is also reduced on a very large scale.

There have been known few teeth saw blades, already, having teeth with singular groups on the edge of the blade, whereby the danger of accidents is not eliminated however. Other blades with single teeth show advantages, indeed, regarding the prevention of hurtings by cutting, but they fail to have the good sawdust guiding and tend to an undesired running hot, which in its turn may be followed by marks of burning, relaxing and cracking and bursting of the blade. In addition to it, the friction of the sawdust results in a higher demand of energy.

Behind each group of teeth a sawdust catching chamber or groove with an ejector is provided on the blade, according to this invention. This sawdust catching chamber takes up the current of sawdust running through the set of the cutting saw teeth and the sawdust otherwise being in the notch of cut, which the ejector casts out of the reach of the blade, assisting them by its form in their centrifugal motion. The untoothed or non-cutting part of the blade, which follows behind the ejector and extends to the sawdust chamber of the first cutting tooth of the next group of teeth, exclusively undertakes the protection of the operator, that in the few teeth saw blades hitherto known is practised by the long ridge of the cutting tooth. The special shape of the ejector passing contrarily to the cutting motion of the saw blade, is explained by the drawing.

Figure 1 shows an example of the performance of this invention on a circular saw blade and Figure 2 on a band saw blade.

The circular saw blade disc or body 1 has five groups of teeth with two crosswise cutting teeth 2 and 3, which are regularly divided over the periphery. Behind these teeth the sawdust catching chamber or groove 4 with the ejector 5, consisting of the non-cutting breast 6 forming the ejector surface, and of the untoothed face portion 7 adjoining with a more or less large transition arch, and extending to the sawdust chamber 8 of the first cutting tooth 2 of the next group of teeth. The shape and inclination of the breast 6 of the ejector 5 is determined by the operating conditions, especially by the working speed of the teeth. It became evident that a backward inclination of ca. 40° to the motion path of the teeth is favourable in the most cases of operation.

As the cutting edges of the teeth 2 and 3 are projecting only 0.7 to 1 mm. out of the periphery of the saw blade 1, the finger of the operator, if he is incautiously touching the saw, can only be slightly scratched, and a serious hurt is thus excluded that the ejector ridge 7 prevents the radial drawing in of a part of the hand, so that an untightening during the terror-second is possible.

The sawdust running through the set of the cutting teeth 2 and 3 is taken up when coming to the level of the sawdust catching chamber 4, and is ejected in the direction of cut by the breast 6 of the ejector 5, assisted by the centrifugal force acting upon it. Thus the disadvantage, arising with saw blades without any sawdust catching chamber, is avoided that the sawdust is falling between the saw blade and the notch of cut, sticking together here and producing the well-known marks of burning together with the consequences of relaxing and even cracking of the blade, already mentioned above.

For the band saw blade 9, according to Figure 2, the same is synonymously valid, which was told of the circular saw blade. The set cutting teeth are designated by 10 and 11, and the sawdust catching chamber 12 with the ejector 13, 14 and 15 is adjoining to them. On band saws without a sawdust catching chamber 12 and the ejector 13, 14, the sawdust falls partly on the tyre of the lower wheel of the band saw, where it is tightly rolled, if additional means, for inst. brushes are not provided, which currently remove this sawdust. By the sawdust catching chamber 12 with the ejector 13, 14 the sawdust is ejected in the direction of cut. It is obvious that because of the free running of the blades, obtained in this manner, a quiet guiding of the saw band is warranted.

The invention is not restricted to teeth groups of two set teeth; each group of teeth is allowed to have also more than two teeth; in principle the employment of this invention is also conceivable on saw blades with single teeth arranged in larger intervals from each other.

I claim:

1. A saw blade for power saws comprising a circular blade adapted to be rotated continuously in one direction for cutting, said blade having a plurality of groups of peripheral cutting teeth, each group being separated by a relatively larger non-cutting peripheral arcuate edge portion of said blade, said cutting teeth having cutting edges defining a positive angle with respect to the work, and an auxiliary chip-ejecting gullet adjacent the rearmost tooth of each of said groups of cutting teeth and forward of the non-cutting edge portion of the saw blade behind the rearmost tooth of each of said groups of cutting teeth, said chip-ejecting gullets each having a non-cutting rear edge rearwardly inclined to expel chips outwardly of the saw cut being made by said cutting teeth, said teeth cutting edges projecting slightly beyond the radial extent of said non-cutting peripheral arcuate edge portions of said blade.

2. A saw blade for power saws comprising a circular blade adapted to be rotated continuously in one direction for cutting, said blade having a plurality of groups of peripheral cutting teeth, each group being separated by a non-cutting peripheral arcuate edge portion of said blade, said non-cutting edge portion having a peripheral length on said saw blade of at least twice the peripheral length of each of said groups of cutting teeth, said cutting teeth having cutting edges defining a positive angle with respect to the work, and an auxiliary chip-ejecting gullet adjacent the rearmost tooth of each of said groups of cutting teeth and forward of the non-cutting edge portion of the saw blade behind the rearmost tooth of each of said groups of cutting teeth, said chip-ejecting gullets each having a non-cutting rear edge rearwardly inclined to expel chips outwardly of the saw cut being made by said cutting teeth, said teeth cutting edges projecting slightly beyond the radial extent of said non-cutting peripheral arcuate edge portions of said blade.

References Cited in the file of this patent

UNITED STATES PATENTS

| | | |
|---|---|---|
| 149,748 | Hale | Apr. 14, 1874 |
| 503,522 | Bowles | Aug. 15, 1893 |
| 1,334,633 | Piocle | Mar. 23, 1920 |
| 2,657,720 | Wolfe | Nov. 3, 1953 |
| 2,720,229 | Drake | Oct. 11, 1955 |

FOREIGN PATENTS

| | | |
|---|---|---|
| 887,701 | Germany | Aug. 27, 1953 |
| 895,370 | Germany | Nov. 2, 1953 |